United States Patent
Sekharan

(10) Patent No.: US 10,229,099 B2
(45) Date of Patent: Mar. 12, 2019

(54) SHARED AND PRIVATE ANNOTATION OF CONTENT FROM A COLLABORATION SESSION

(71) Applicant: Business Objects Software Limited, Dublin (IE)

(72) Inventor: Satishkumar Sekharan, New Westminster (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 92 days.

(21) Appl. No.: 15/077,547

(22) Filed: Mar. 22, 2016

(65) Prior Publication Data

US 2017/0277669 A1    Sep. 28, 2017

(51) Int. Cl.
*G06F 17/24* (2006.01)
*G06T 11/20* (2006.01)

(52) U.S. Cl.
CPC .......... *G06F 17/241* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 8,676,735 B1 | 3/2014 | Heidenreich et al. | |
| 8,806,024 B1* | 8/2014 | Toba Francis | .... G06F 17/30873 709/227 |
| 9,319,442 B2 | 4/2016 | Griffin et al. | |
| 9,716,861 B1* | 7/2017 | Poel | .......... H04N 7/15 |
| 2007/0192410 A1* | 8/2007 | Liversidge | ............. G06Q 10/10 709/204 |
| 2009/0037517 A1* | 2/2009 | Frei | ................... G06F 17/30893 709/202 |
| 2014/0337705 A1* | 11/2014 | Glover | .................. G06F 17/241 715/230 |
| 2015/0178260 A1* | 6/2015 | Brunson | ............... G06F 17/241 715/202 |
| 2015/0378995 A1* | 12/2015 | Brown | ................ H04L 12/1827 707/608 |
| 2017/0017631 A1 | 1/2017 | Tang et al. | |
| 2017/0132181 A1 | 5/2017 | Van As et al. | |

* cited by examiner

*Primary Examiner* — Asher D Kells
(74) *Attorney, Agent, or Firm* — Fountainhead Law Group P.C.

(57) ABSTRACT

Some embodiments provide a non-transitory machine-readable medium that stores a program executable by at least one processing unit of a first device. The program generates, at the first device, a snapshot of a digital content page being presented by a second device. The program also provides a set of annotation tools for annotating the snapshot of the digital content page. The program further adds a set of annotations to the snapshot of the digital content page using the set of annotation tools.

20 Claims, 17 Drawing Sheets

```
"dom": {
  "nodeType": 1,
  "id": 2,
  "tagName": "HTML",
  "attributes": {

},
  "childNodes": [
    {
      "nodeType": 1,
      "id": 3,
      "tagName": "HEAD",
      "attributes": {
      },
              ⋮

{
      "nodeType": 1,
      "id": 13,
      "tagName": "BODY",
      "attributes": {

},
      "childNodes": [
        {
          "nodeType": 3,
          "id": 14,
          "textContent": "\n "
        },
        {
          "nodeType": 1,
          "id": 15,
          "tagName": "DIV",
          "attributes": {
            "id": "barChart"
          },
          "childNodes": [
            {
              "nodeType": 3,
              "id": 16,
              "textContent": "\n "
            },
            {
              "nodeType": 1,
              "id": 17,
              "tagName": "svg",
              "attributes": {
                "class": "marks",
                "width": "184",
                "height": "315"
              },
                      ⋮
```

```
"models": [
  {
    "id": "17",
    "spec": {
      "description": "Sales reps by Region",
      "data": {
        "values": [
          {
            "Region": "Asia",
            "Sales_Rep": 88
          },
          {
            "Region": "Japan",
            "Sales_Rep": 55
          },
          {
            "Region": "Europe",
            "Sales_Rep": 113
          },
          {
            "Region": "North America",
            "Sales_Rep": 191
          },
          {
            "Region": "South America",
            "Sales_Rep": 97
          }
        ]
      },
      "mark": "bar",
      "encoding": {
        "y": {
          "type": "quantitative",
          "field": "Sales_Rep"
        },
        "x": {
          "type": "ordinal",
          "field": "Region"
        }
      }
    }
  }
]
```

FIG. 7

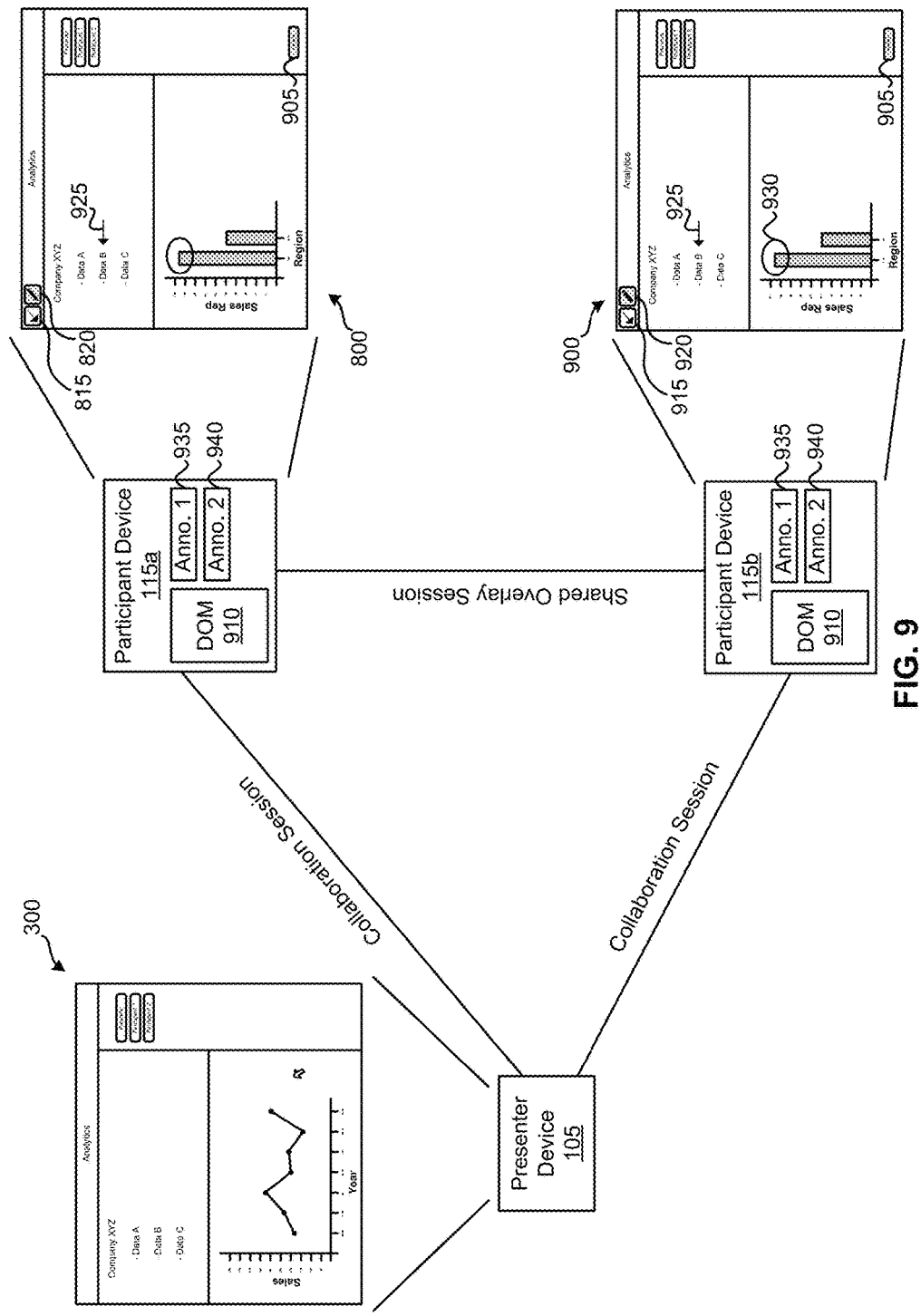

SHARED AND PRIVATE ANNOTATION OF CONTENT FROM A COLLABORATION SESSION

BACKGROUND

Today, there are many tools that may be used to allow people to collaborate with one another. For example, audio communication (e.g., a telephone call, an audio conference, etc.) tools allow people to talk to one another. Visual tools such as video conferencing, shared workspace applications, etc. allow people to view, share, demonstrate information. Many other tools may be used also, such as e-mail, messaging/chat, discussion boards, etc. for collaboration purposes.

SUMMARY

In some embodiments, a non-transitory machine-readable medium stores a program executable by at least one processing unit of a first device. The program generates, at the first device, a snapshot of a digital content page being presented by a second device. The program also provides a set of annotation tools for annotating the snapshot of the digital content page. The program further adds a set of annotations to the snapshot of the digital content page using the set of annotation tools.

In some embodiments, generating the snapshot of the digital content page includes generating a document object model (DOM) of the digital content page. The program may also send the third device the DOM of the digital content page for the third device to reproduce the snapshot of the digital content page for display on the third device. The program may further send a set of annotation data to the third device for the third device to update the reproduced digital content page with the set of annotations based on the set of annotation data. In some embodiments, the first, second, and third devices are in a collaboration session where the second device is sharing the digital content page with the first and third devices.

In some embodiments, the program also receives an input to enable a private overlay feature provided by the first device. Generating the snapshot of the digital content page and providing the set of annotation tools may be performed in response to receiving the input. The program may also receive a request from the second device to share the snapshot and the set of annotations and send the second device a document object model (DOM) of the digital content page for the second device to reproduce the snapshot of the digital content page for display on the second device. In some embodiments, the set of annotations is a first set of annotations. The program may also receive a set of annotation data from the second device that represents a second set of annotations added to the snapshot of the digital content page by the second device and update the snapshot of the digital content page with the second set of annotations based on the set of annotation data.

In some embodiments, a method generates, at a first device, a snapshot of a digital content page being presented by a second device. The method also provides a set of annotation tools for annotating the snapshot of the digital content page. The method further adds a set of annotations to the snapshot of the digital content page using the set of annotation tools.

In some embodiments, generating the snapshot of the digital content page includes generating a document object model (DOM) of the digital content page. The method may also send the third device the DOM of the digital content page for the third device to reproduce the snapshot of the digital content page for display on the third device. The method may further send a set of annotation data to the third device for the third device to update the reproduced digital content page with the set of annotations based on the set of annotation data. In some embodiments, the first, second, and third devices are in a collaboration session where the second device is sharing the digital content page with the first and third devices.

In some embodiments, the method also receives an input to enable a private overlay feature provided by the first device. Generating the snapshot of the digital content page and providing the set of annotation tools may be performed in response to receiving the input. The method may also receive a request from the second device to share the snapshot and the set of annotations and send the second device a document object model (DOM) of the digital content page for the second device to reproduce the snapshot of the digital content page for display on the second device. In some embodiments, the set of annotations is a first set of annotations. The method may also receive a set of annotation data from the second device that represents a second set of annotations added to the snapshot of the digital content page by the second device and update the snapshot of the digital content page with the second set of annotations based on the set of annotation data.

In some embodiments, a system includes a set of processing units, a memory, and a machine-readable medium that stores a program. The program causes at least one processing unit to generate, at the first device, a snapshot of a digital content page being presented by a second device. The program also causes the at least one processing unit to provide a set of annotation tools for annotating the snapshot of the digital content page. The program further causes the at least one processing unit to add a set of annotations to the snapshot of the digital content page using the set of annotation tools.

In some embodiments, generating the snapshot of the digital content page may include generating a document object model (DOM) of the digital content page. The program may also cause the at least one processing unit to send the third device the DOM of the digital content page for the third device to reproduce the snapshot of the digital content page for display on the third device. The program may further cause the at least one processing unit to send a set of annotation data to the third device for the third device to update the reproduced digital content page with the set of annotations based on the set of annotation data.

In some embodiments, the program also causes the at least one processing unit to receive an input to enable a private overlay feature provided by the first device. Generating the snapshot of the digital content page and providing the set of annotation tools may be performed in response to receiving the input. The program may also cause the at least one processing unit to receive a request from the second device to share the snapshot and the set of annotations and send the second device a document object model (DOM) of the digital content page for the second device to reproduce the snapshot of the digital content page for display on the second device. In some embodiments, the set of annotations is a first set of annotations. The program may also cause the at least one processing unit to receive a set of annotation data from the second device that represents a second set of annotations added to the snapshot of the digital content page by the second device and update the snapshot of the digital content page with the second set of annotations based on the set of annotation data.

The following detailed description and accompanying drawings provide a better understanding of the nature and advantages of the present invention.

BRIEF DESCRIPTION OF THE DRAWINGS

FIG. 6 illustrates a document object model (DOM) of a content page according to some embodiments.

FIG. 7 illustrates contextual data associated with the content page illustrated in FIG. 6 according to some embodiments.

FIG. 9 illustrates a shared overlay feature according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing analytic data for a collaboration application. In some embodiments, a collaboration application operating on a first device communicates in real-time with a collaboration application operating on a second device. The collaboration applications may include video and/or audio conferencing features as well as a sharing feature (e.g., a screen sharing feature, a desktop sharing feature, etc.). In some instances, the collaboration application operating on the first device may share with the collaboration application operating on the second device analytics data and contextual information associated with the collaboration application operating on the first device. Based on the analytics data and the contextual information associated with the collaboration application operating on the first device, the collaboration applications operating on the second device may retrieve and provide on the second device additional data associated with the analytics data.

In some embodiments, the collaboration applications include an overlay feature for annotating shared information. For example, the collaboration application operating on the first device may share data with the collaboration application operating on the second device. The overlay feature of the collaboration applications may allow a user of the second device to provide annotations associated with the shared data on an overlay generated on the second device. In some embodiments, the collaboration application operating on the second device may share with the collaboration application operating on the first device the overlay generated on the second device.

Figure 1:
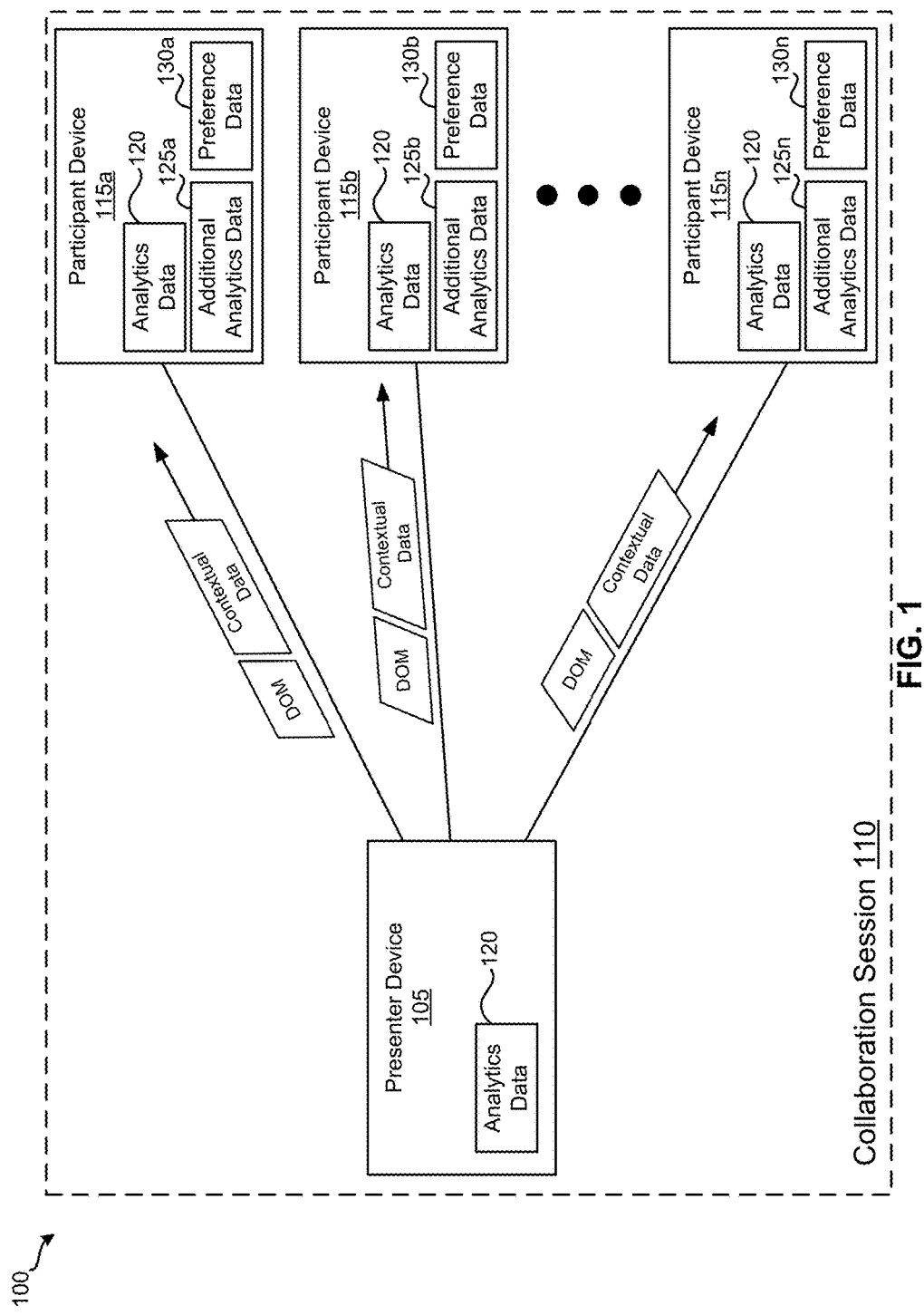
FIG. 1 illustrates a system of devices in a collaboration session according to some embodiments.

FIG. 1 illustrates a system of devices in a collaboration session according to some embodiments. As shown, system 100 includes presenter device 105 and participant devices 115a-115n. In this example, presenter device 105 and participant devices 115a-115n have established collaboration session 110 in which presenter device 105 is presenting analytics data 120 stored on presenter device 105 to participant devices 115a-115n. Analytics data 120 may be provided by a data analytics application hosted on a cloud computing system, operating on a server, operating on the presenter device 105, etc. In some embodiments, analytics data 120 may include information, statistics, visualizations, etc., related to, associated with, and/or derived from examining and/or analyzing data.

Presenter device 105 is configured to establish and manage collaboration session 110 with participant devices 115a-115n. As mentioned above, presenter device 105 is presenting analytics data 120 to participant devices 115a-115n in this example. In some embodiments, presenter device 105 presents analytics data 120 to participant devices 115a-115n using a communication protocol (e.g., a WebSocket protocol). Via such a communication protocol, presenter device 105 presents, in some such embodiments, analytics data 120 to participant devices 115a-115n using a screen sharing feature that allows presenter device 105 to present the content being displayed on a display of presenter device 105 to participant devices 115a-115n.

For this example, analytics data 120 that presenter device 105 is presenting to participant devices 115a-115n is in the form of a digital content page (e.g., a web page) represented by a document object model (DOM). In some embodiments, a DOM is a structured representation of a document. To share the digital content page to participant devices 115a-115n, presenter device 105 generates a copy of the DOM of the digital content page and contextual data associated with the DOM of the digital content page. As shown in FIG. 1, presenter device 105 sends the DOM and the contextual data to each of the participant devices 115a-115n. In some embodiments, presenter device 105 also sends additional information (e.g., a location of a cursor displayed on a display of presenter device 105) to participant devices 115a-115n. In some embodiments, presenter device 105 generates and sends the DOM and contextual data to participant devices 115a-115n continuously or at defined intervals (e.g., once every 30 seconds, once a minute, once every five minutes, etc.).

In some instances, the digital content page being presented to participant devices 115a-115n may change. For instance, a user of presenter device 105 may manipulate the current digital content page or navigate to, or open, a new digital content page. When the digital content page being presented to participant devices 115a-115n changes, presenter device 105 may generate a copy of the DOM of the modified digital content page and contextual data associated with the DOM of the modified digital content page. Presenter device 105 then sends the DOM and contextual data to participate devices 115a-115n. This way, participant devices 115a-115n may receive the digital content page that presenter device 105 is presenting in a real-time manner.

Participant devices 115a-115n are each configured to establish collaboration session 110 with presenter device 105. Once collaboration session 110 is established, each of the participant devices 115a-115n may receive (e.g., continuously, at defined intervals, based on changes to the content being presented by presenter device 105, etc.) a DOM of a digital content page that is being presented by presenter device 105 as well as contextual data associated with the digital content page, as illustrated in FIG. 1. When a particular participant device 115 receives the DOM and the contextual data, the particular participant device 115 reproduces the digital content page using the DOM. As mentioned above, in some embodiments, presenter device 105 may send additional information (e.g., a location of a cursor displayed on a display of presenter device 105) to participant devices 115a-115n. In some such embodiments, the particular participant device 115 may use the additional information to reproduce the digital content page.

Participant devices 115a-115b are each further configured to access additional analytics data 125 based on the contextual data associated with the DOM of the digital content page being presented by presenter device 105. In some embodiments, a particular participant device 115 accesses additional analytics data 125 based on preference data 130 stored on the particular participant device 115. Examples of preference data may include a user identifier (ID) of a user using the particular participant device 115, a location (e.g., country, state, province, city, etc.) of the user or from which the user is logged in, a history of analytics used by the user, types of analytics that the user has specified, analytics usage patterns of the user, time zone information associated with the user or the particular participant device 115, resources to which the user has access based on an authentication status of the user, etc. Participant devices 115a-115n may present the accessed additional analytics data to users of participant devices 115a-115n in order to supplement and/or augment the analytics data being presented by presenter device 105. While FIG. 1 shows additional analytics data 125a-125n stored respectively on participant devices 115a-115n, additional analytics data 125a-125n may, in some embodiments, be stored in a storage (e.g., a database, a server, a web service, etc.) external to participant devices 115a-115n. In some such embodiments, participant devices 115a-115n may access the additional analytics data 125a-125n by querying, downloading from, etc., additional analytics data 125a-125n from the external storage.

FIG. 1 illustrates a technique where a presenter device shares analytics data and contextual data to several participant devices and the participant devices may access and present additional analytics data based on the contextual data and, optionally, preference data. One of ordinary skill in the art will understand that such a technique may be applicable to other types of data besides analytics data. For instance, a presenter device may share financial data and contextual data associated with the financial data to several participant devices and the participant devices may access and present additional financial data based on the contextual data and, optionally, preference data.

Figure 2:
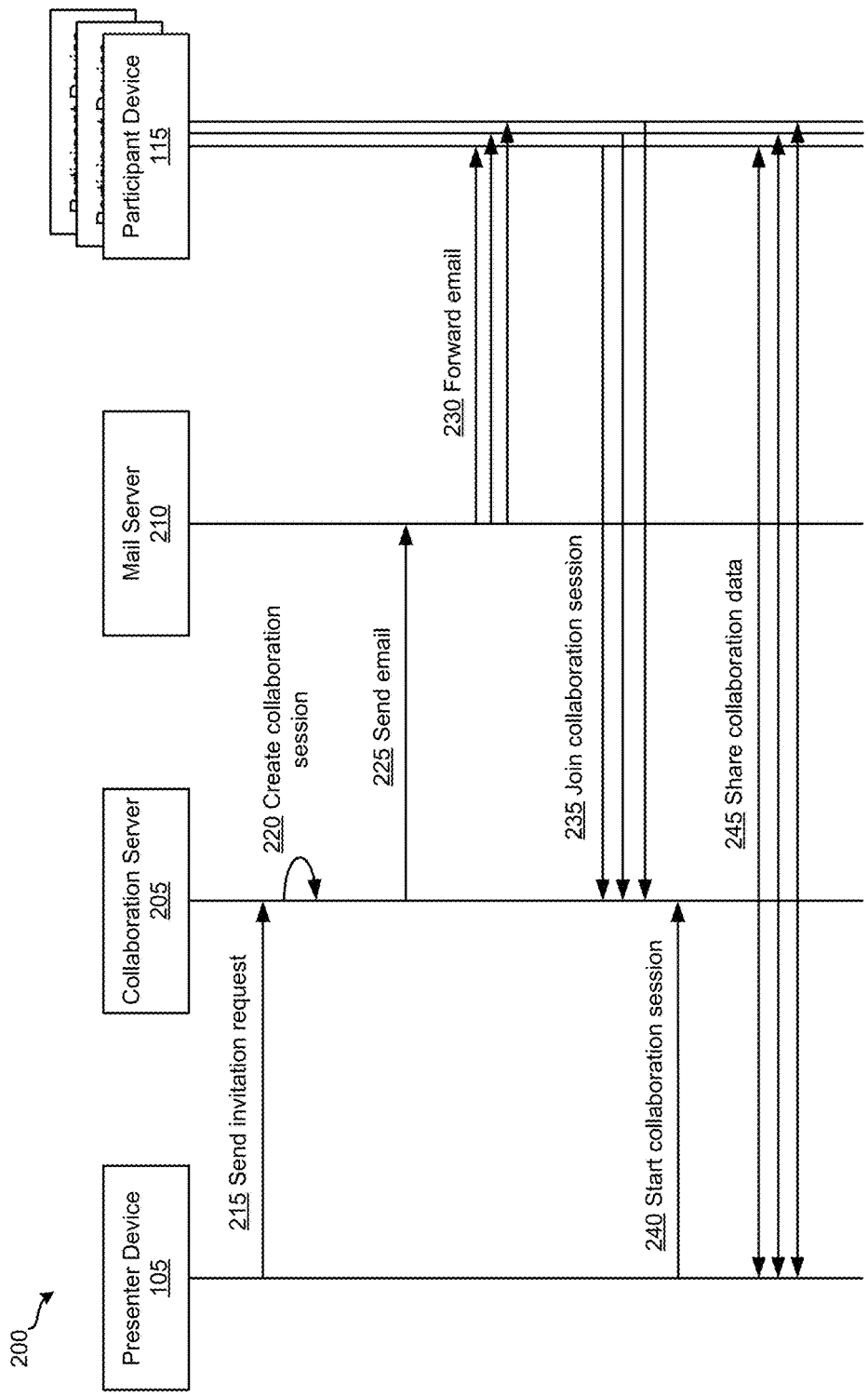
FIG. 2 illustrates a data flow for establishing a collaboration session according to some embodiments.

FIG. 2 illustrates a data flow 200 for establishing a collaboration session according to some embodiments. In some embodiments, data flow 200 may be used to establish collaboration session 110. For this example, collaboration server 205 may be a computing device that is a part of a cloud computing system. Mail server 210 is a computing device that manages delivery and receipt of electronic mail. In some embodiments, mail server 210 is part of the cloud computing system that collaboration server 205 is a part of. In other embodiments, mail server 210 is a stand-alone system or part of a system different from the cloud computing system that collaboration server 205 is a part of.

Data flow 200 starts by presenter device 105 sending, at 215, an invitation request to collaboration server 205. In some embodiments, a user of presenter device 105 creates the invitation request by initiating (e.g., selecting a user interface (UI) item in a GUI provided by collaboration server 205) an invitation creation tool provided by collaboration server 205 and specifying through the invitation creation tool one or more users to include in the invitation request. In this example, the invitation request specifies users of participant devices 115. Once the user of presenter device 105 has finished creating the invitation request, presenter device 105 sends the invitation request to collaboration server 205.

Next, collaboration server 205 creates, at 220, a collaboration session. After creating the collaboration session, collaboration server 205 creates an email communication that includes a reference (e.g., a hypertext transfer protocol (HTTP) hyperlink) to the collaboration session. Collaboration server 205 then sends, at 225, the email to mail server 210 for processing. When mail server 210 receives the email, mail server 210 forwards, at 230, the email to the users specified in the email, which are the users of participant devices 115 in this example.

When a user of a particular participant device 115 receives the email, the user may access (e.g., by selecting or clicking) the reference to the collaboration session included in the email. In response, the particular participant device 115 joins, at 235, the collaboration session. The user of presenter device 105 may start, at 240, the collaboration session. While FIG. 2 shows presenter device 105 starting the collaboration session after participant devices 115 joins the collaboration session, any number of participant devices 115 may join the collaboration session after presenter device 105 starts the collaboration session.

Once presenter device 105 starts the collaboration session, presenter device 105 shares, at 245 collaboration data with each of the participant devices 115. In some embodiments, the collaboration data includes analytics data 120, DOMs associated with analytics data 120, contextual data, other types of information (e.g., a location of a cursor displayed on a display of presenter device 105), etc. Presenter device 105 may share the collaboration data in the same or similar manner as that described above by reference to FIG. 1. In some embodiments, the collaboration session includes audio conferencing and/or video conferencing features. In some such embodiments, the collaboration data includes audio conference data and/or video conference data. A real-time communication technology (e.g., a web real-time communication (WebRTC) technology) may be used to implement the audio conferencing and/or video conferencing features. In some embodiments, presenter device 105 communicates with participant devices 115 using a peer-to-peer (P2P) network architecture. Presenter device 105 and participant devices 115 may implement collaboration session 110 through web browsing applications operating on presenter device 105 and participant devices 115 in some embodiments.

Figure 4:
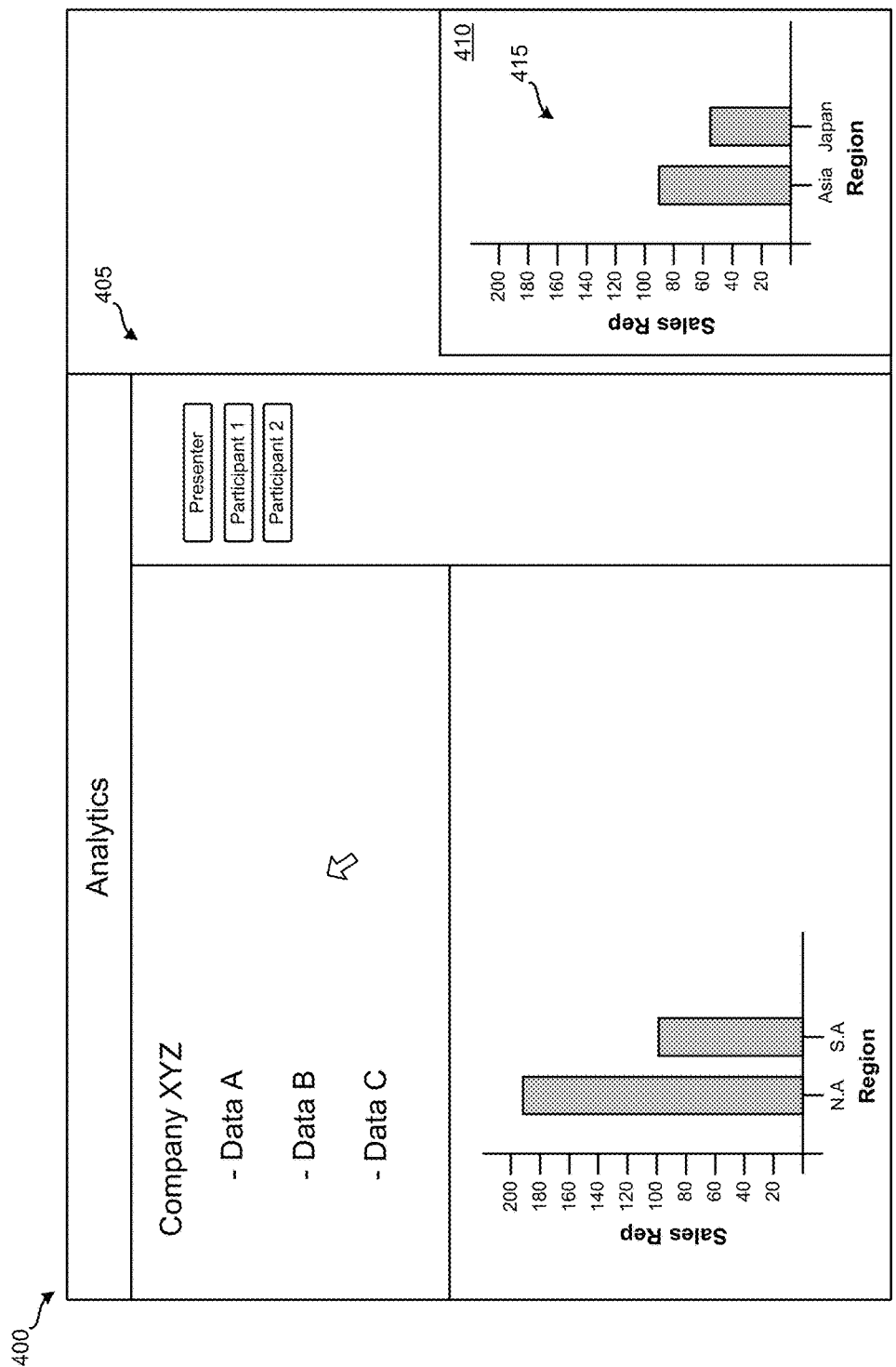
FIG. 4 illustrates a GUI provided by a collaboration application operating on a participant device according to some embodiments.
Figure 5:
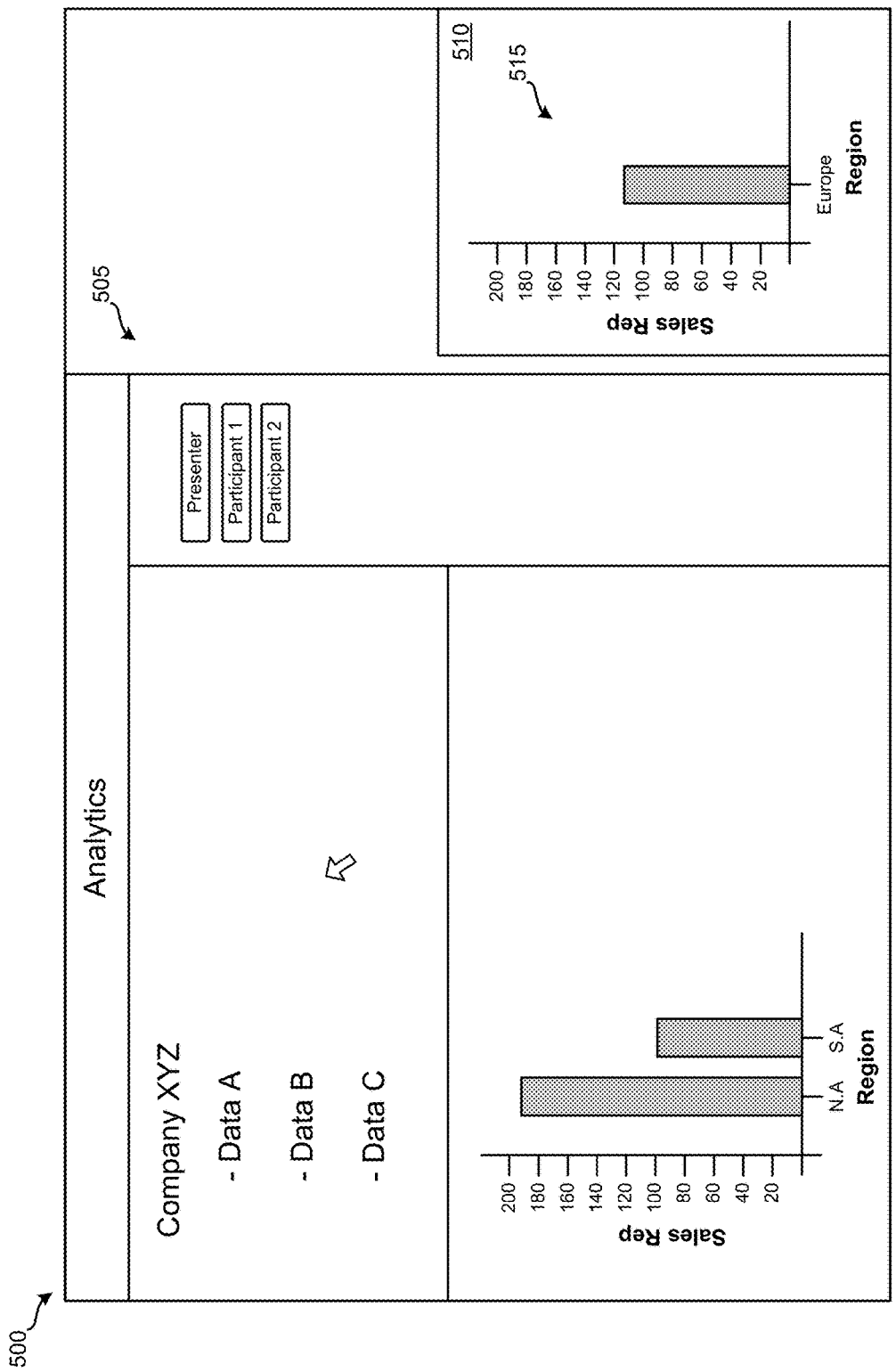
FIG. 5 illustrates a GUI provided by a collaboration application operating on another participant device according to some embodiments.

In some embodiments, the operations performed by presenter device 105 described above by reference to FIGS. 1 and 2 are implemented in a collaboration application operating on presenter device 105. Similarly, the operations performed by each of the participant devices 115 described above by reference to FIGS. 1 and 2 are implemented in a collaboration application operating on the participant device 115. The collaboration application operating on each of the devices may provide a GUI for interacting with the collaboration application and displaying information on a display of the device. The following FIGS. 3-5 illustrate GUIs provided by collaboration applications operating on a presenter device and two participant devices that have established a collaboration session (e.g., according data flow 200).

Figure 3:
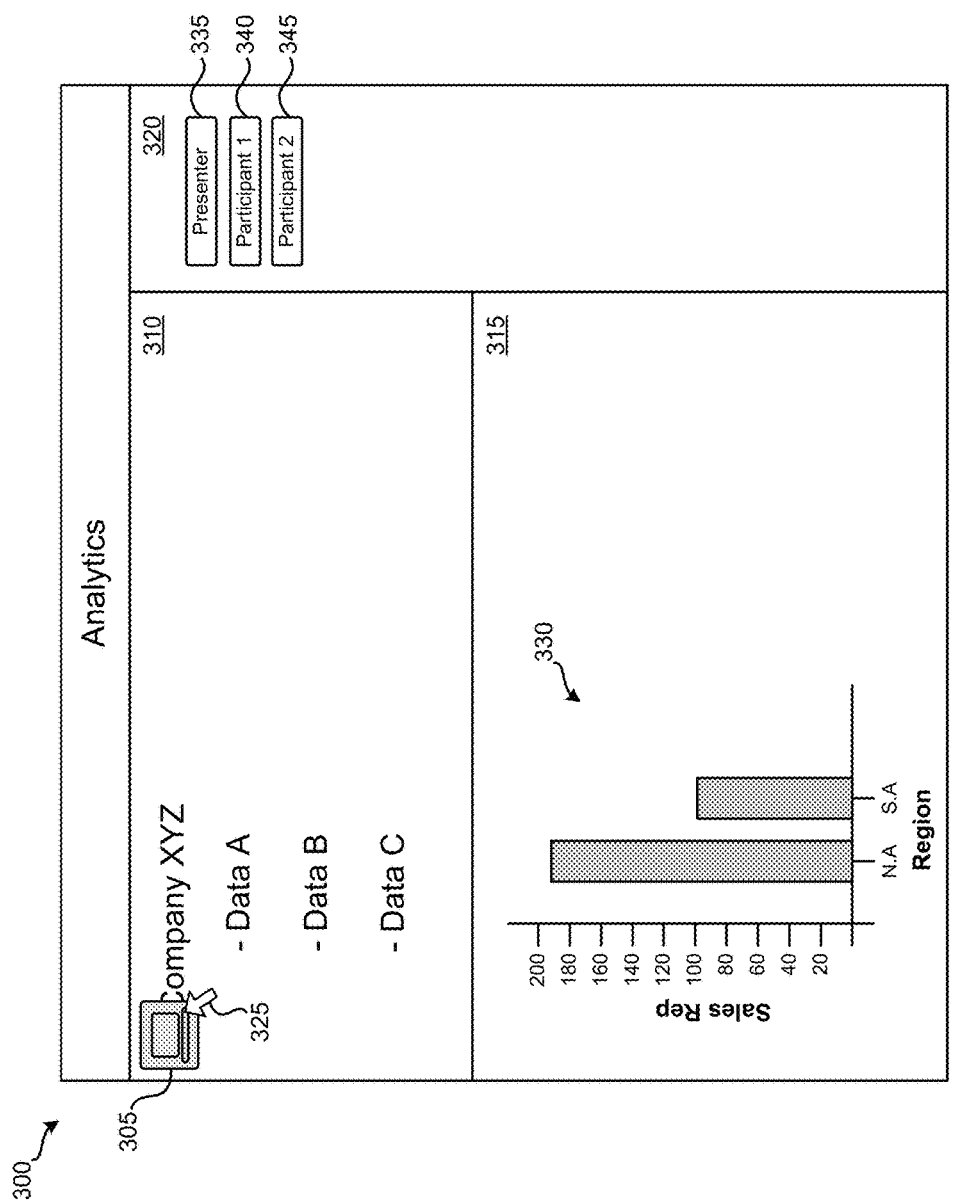
FIG. 3 illustrates a graphical user interfaces (GUI) provided by a collaboration application operating on a presenter device according to some embodiments.

FIG. 3 illustrates a GUI 300 provided by a collaboration application operating on a presenter device according to some embodiments. For this example, the collaboration application operating on presenter device 105 has established a collaboration session (e.g., collaboration session 110) with two participant devices and is providing GUI 300, a digital page of analytics data, on a display of presenter device 105. As shown, GUI 300 includes a selectable UI item 305, display areas 310 and 315, panel 320, and cursor 325.

UI item 305 is configured to enable, when selected, a screen sharing feature. When the screen sharing feature is enabled, the collaboration application shares GUI 300 with participant devices (e.g., participant devices 115) in the manner described above by reference to FIG. 1. That is, the collaboration application generates a copy of the DOM of GUI 300, the contents being displayed on presenter device 105, and contextual data associated with the DOM of the digital content page; sends the DOM, contextual data, etc. to the participant devices; etc.

When cursor 325 is at or near the top left region of display area 310, the collaboration application may overlay UI item 305 in the top left region of display area 310, as shown in FIG. 3. When cursor 325 is no longer at or near the top left region of display area 310, the collaboration application may remove UI item 305 from display area 310. In this example, a user has moved cursor 325 to the top left region of display area 310 thereby causing the collaboration application to display UI item 305. The user in this example has also selected UI item 305 using cursor 325 to share GUI 300 with the participant devices in the collaboration session. The selection of UI item 305 is indicated by a gray highlighting of UI item 305.

Display areas 310 and 315 are configured to display information (e.g., analytics data). For this example, display area 310 is displaying analytics data associated with a company and display area 315 is displaying visualization 330 of analytics data. Specifically, visualization 330 includes a bar chart depicting the number of sales representatives for a North America (N.A.) region and a South America (S.A.) region.

Panel 320 is configured to display devices that are in the collaboration session. As shown, panel 320 is displaying UI items 335, 340, and 345, which represent presenter device 105 and participant devices 105, respectively. When a participant device joins (e.g., performs operation 235) the collaboration session, the collaboration application displays a UI item that represents the participant device in panel 320. When a participant device leaves the collaboration session, the collaboration application removes the UI item that represents the participant device from panel 320.

FIG. 4 illustrates a GUI 400 provided by a collaboration application operating on a participant device according to some embodiments. For this example, the collaboration application operating on participant device 115a has established a collaboration session (e.g., collaboration session 110) with presenter device 105 and is providing GUI 400 on a display of participant device 115a. As shown, GUI 400 includes display areas 405 and 410.

Display area 405 is configured to display the screen of presenter device 105 when presenter device 105 enables the screen sharing feature (e.g., when a user of presenter device 105 selects UI item 305). When the collaboration application operating on participant device 115a receives a DOM of the contents being displayed on presenter device 105 (GUI 300 in this example), the collaboration application uses the DOM to reproduce the contents being displayed on presenter device 105. As shown in FIG. 4, display area 405 is displaying a reproduction of GUI 300, a digital content page of analytics data.

Display area 410 is configured to display additional analytics data associated with the contents displayed in display area 405. As mentioned above, presenter device 105 may send to participant devices contextual data associated with the DOM of the contents being displayed on presenter device 105. When the collaboration application operating on participant device 115a receives the contextual data associated with the DOM of the contents being displayed on presenter device 105 (GUI 300 in this example), the collaboration application accesses additional analytics data based on the received contextual data and preference data (e.g., preference data 130a) stored on participant device 115a. In this example, the contextual data includes data indicating that visualization 330 in GUI 300 is a visualization based on data related to sales representatives and region and the preference data stored on participant device 115a includes data indicating that a user of participant device 115a is located in Asia. Based on such data, the collaboration application operating on participant device 115a in this example accesses data related to sales representatives in Asian regions (Asia and Japan for this example). The collaboration application generates visualization 415 based on the accessed data and displays visualization 415 in display area 410. As shown, visualization 415 includes a bar chart depicting the number of sales representatives for an Asia region and a Japan region.

FIG. 5 illustrates a GUI provided by a collaboration application operating on another participant device according to some embodiments. For this example, the collaboration application operating on participant device 115b has established a collaboration session (e.g., collaboration session 110) with presenter device 105 and is providing GUI 500 on a display of participant device 115b. As shown, GUI 500 includes display areas 505 and 510. In this example, display areas 505 and 510 are the same as and/or similar to display areas 405 and 410. That is, display area 505 displays the screen of presenter device 105 (GUI 300 in this example) when presenter device 105 enables the screen sharing feature (e.g., when a user of presenter device 105 selects UI item 305) and display area 510 displays additional analytics data associated with the contents displayed in display area 505.

For this example, when the collaboration application operating on participant device 115b receives the contextual data associated with the DOM of the contents being displayed on presenter device 105 (GUI 300 in this example), the collaboration application accesses additional analytics data based on the received contextual data and preference data (e.g., preference data 130b) stored on participant device 115b. In this example, the contextual data includes data indicating that visualization 330 in GUI 300 is a visualization based on data related to sales representatives and region and the preference data stored on participant device 115*b* includes data indicating that a user of participant device 115*b* is located in Europe. Based on such data, the collaboration application operating on participant device 115*b* in this example accesses data related to sales representatives in a Europe region. The collaboration application generates visualization 515 based on the accessed data and displays visualization 515 in display area 510. As shown, visualization 515 includes a bar chart depicting the number of sales representatives for a Europe region.

FIGS. 4 and 5 show a reproduced screen of analytics data on a presenter device along with additional analytics data displayed in a GUI provided by a collaboration application operating on a participant device. One of ordinary skill in the art will appreciate that the collaboration application operating on the participant device may provide additional analytics data in different ways. For instance, GUI 400/500 may include only shared screen 405/505 and the collaboration application may provide the additional analytics data shown in display area 410/510 in a popup window or overlay window.

FIG. 6 illustrates a document object model (DOM) of a content page according to some embodiments. In particular, FIG. 6 illustrates a portion of a DOM 600 that represents the content page shown in GUI 300. As shown, the elements in DOM 600 are organized in a hierarchical structure of nodes. In this example, element 605, which has an identifier (ID) of 17, represents visualization 330 in GUI 300.

FIG. 7 illustrates contextual data associated with the content page illustrated in FIG. 6 according to some embodiments. For this example, contextual data 700 is associated with visualization 330 in GUI 300 by virtue of contextual data 705's ID of 17, which is the same as the ID of element 605 in DOM 600. As shown, contextual data 700 includes a description of visualization 330, a set of data values that specifies a number of sales representatives for the geographical regions in visualization 330 (North America and South America) as well as a number of sales representatives for additional geographical regions (Asia, Japan, and Europe), information indicating the type of visualization of visualization 330, and information about the x-axis and y-axis of visualization 330.

As shown in FIG. 7, the additional analytics data is included in contextual data 700 (e.g., the number of sales representatives for the Asia, Japan, and Europe regions. As such, when the collaboration application of a participant device receives contextual data 700, the participant accesses additional analytics data by accessing the data values included in contextual data 700 based on the preference data stored on the participant device. Referring to FIG. 4 as an example, the collaboration application operating on participant device 115*a* may access data related to sales representatives in Asian regions based on preference data stored on participant device 115*a* indicating that a user of participant device 115*a* is located in Asia. The collaboration application generates and displays visualization 415 based on the accessed data. Referring to FIG. 5 as another example, the collaboration application operating on participant device 115*b* may access data related to sales representatives in a Europe region based on preference data stored on participant device 115*b* indicating that a user of participant device 115*b* is located in Europe. The collaboration application generates and displays visualization 515 based on the accessed data. One of ordinary skill in the art will understand that additional analytics data may be stored in different locations. For instance, the contextual data may include a reference to additional analytics data (e.g., a location of a database, server, etc.) instead of storing the additional analytics data itself.

FIGS. 3-7 illustrate one example of a presenter device sharing analytics data and participant devices providing additional analytics data based on contextual data associated the shared analytics data and preference data. One of ordinary skill in the art will appreciate that any number of different types of analytics data may be shared and any number of additional analytics data may be provided based on contextual data associated with the analytics data, preference data, and/or other data. For instance, if the shared analytics data is recent sales data (e.g., sales data for the most recent quarter), a particular participant device may provide historical sales data based on an analysis of the recent sales data. As another example, if the shared analytics data is a sales data for a particular period in time, a participant device may provide currency exchange rates for the particular period in time of the sales data based on preference data that indicates the location of a user of the participant device, news articles close to the particular period in time based on the location of the user. As yet another example, if shared analytics data is financial data that is in a particular currency, a participant device may provide the financial data in a different currency based on the location of a user of the participant device. One of ordinary skill in the art will understand that any number of different types of data may be shared. For instance, if the shared data may include location information (e.g., addresses), a participant device may provide a link to the location that is accessible via a mapping application operating on the participant device.

In some embodiments, the collaboration application operating on a participant device may include a private overlay feature that allows a user of the participant device to take a snapshot of the content page being presented by a presenter device and make annotations to the snapshot during a collaboration session. The snapshot and any annotations made to the snapshot may be shared with the presenter device. FIGS. 8A-8E illustrate a private overlay feature according to some embodiments. Specifically, FIGS. 8A-8E illustrate presenter device 105 and participant device 115*a* at five different stages 801-805 of the operation of a private overlay feature.

Figure 8A:
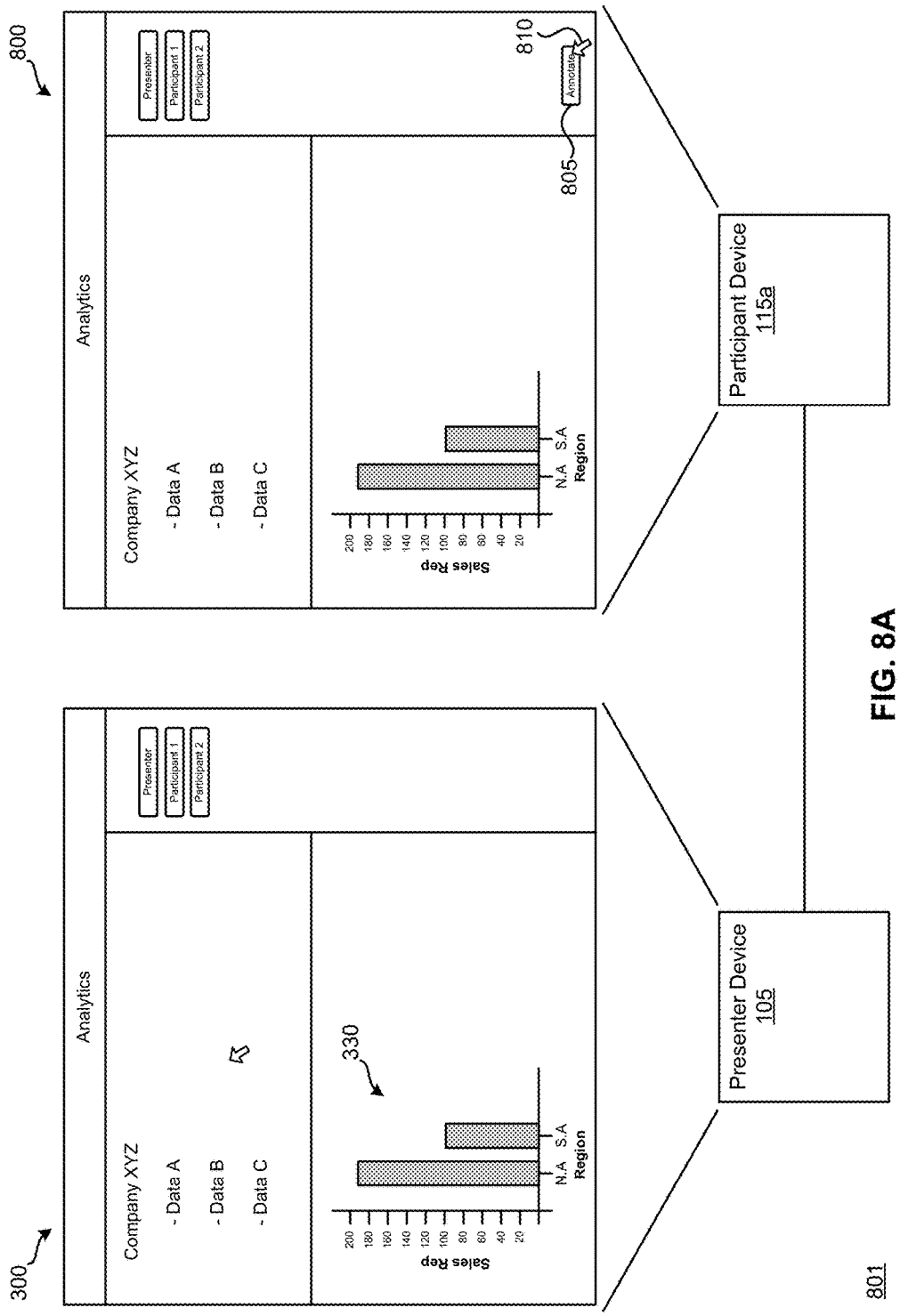
FIGS. 8A-8E illustrate a private overlay feature according to some embodiments.

Referring to FIG. 8A, the first stage 801 illustrates presenter device 105 and participant device 115*a* after presenter device 105 and participant device 115*a* have established a collaboration session (e.g., according data flow 200). The first stage 801 also shows presenter device 105 after the screen sharing feature shown in FIG. 3 has been enabled. As shown, presenter device 105 is presenting a digital content page, which is being shared with participant device 115*a*, that includes analytics data associated with a company and visualization 330. Participant device 115*a* is displaying GUI 800, which is a reproduction of GUI 300. GUI 800 also includes a UI item 805 for enabling a private overlay feature.

Figure 8B:
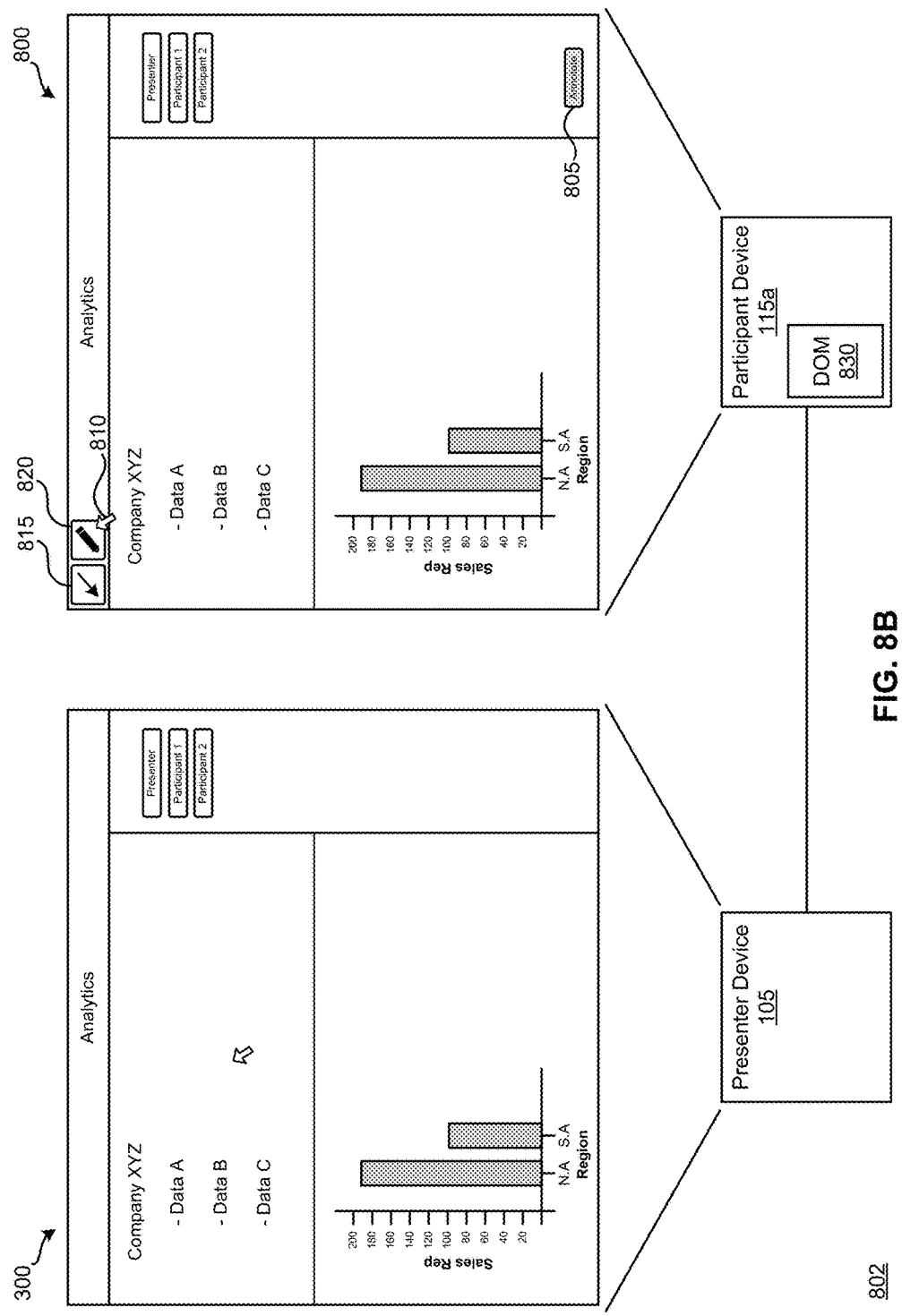

Referring to FIG. 8B, the second stage 802 shows presenter device 105 continuing to present the digital content page illustrated in FIG. 8A. The second stage 802 also shows GUI 800 after a user of participant device 115*a* has selected UI item 805 using cursor 810 to enable the private overlay feature. The selection of UI item 805 is indicated by a gray highlighting of UI item 805. Upon enabling of the private overlay feature, participant device 115*a* generates DOM 830, which represents the digital content page being reproduced in GUI 800 at the instance the private overlay feature is enabled (i.e., the digital content page being presented to participant device 115a by presenter device 105). Also upon enabling of the private overlay feature, participant device 115a stops displaying the digital content page that presenter device 105 is sharing, displays the snapshot of the digital content page that was taken when the private overlay feature was enabled, and provides UI items 815 and 820. UI item 815 is configured to enable an arrow tool for add arrow annotations to the snapshot of the digital content page. UI item 820 is configured to enable a drawing tool for drawing annotations to the snapshot of the digital content page.

Figure 8C:
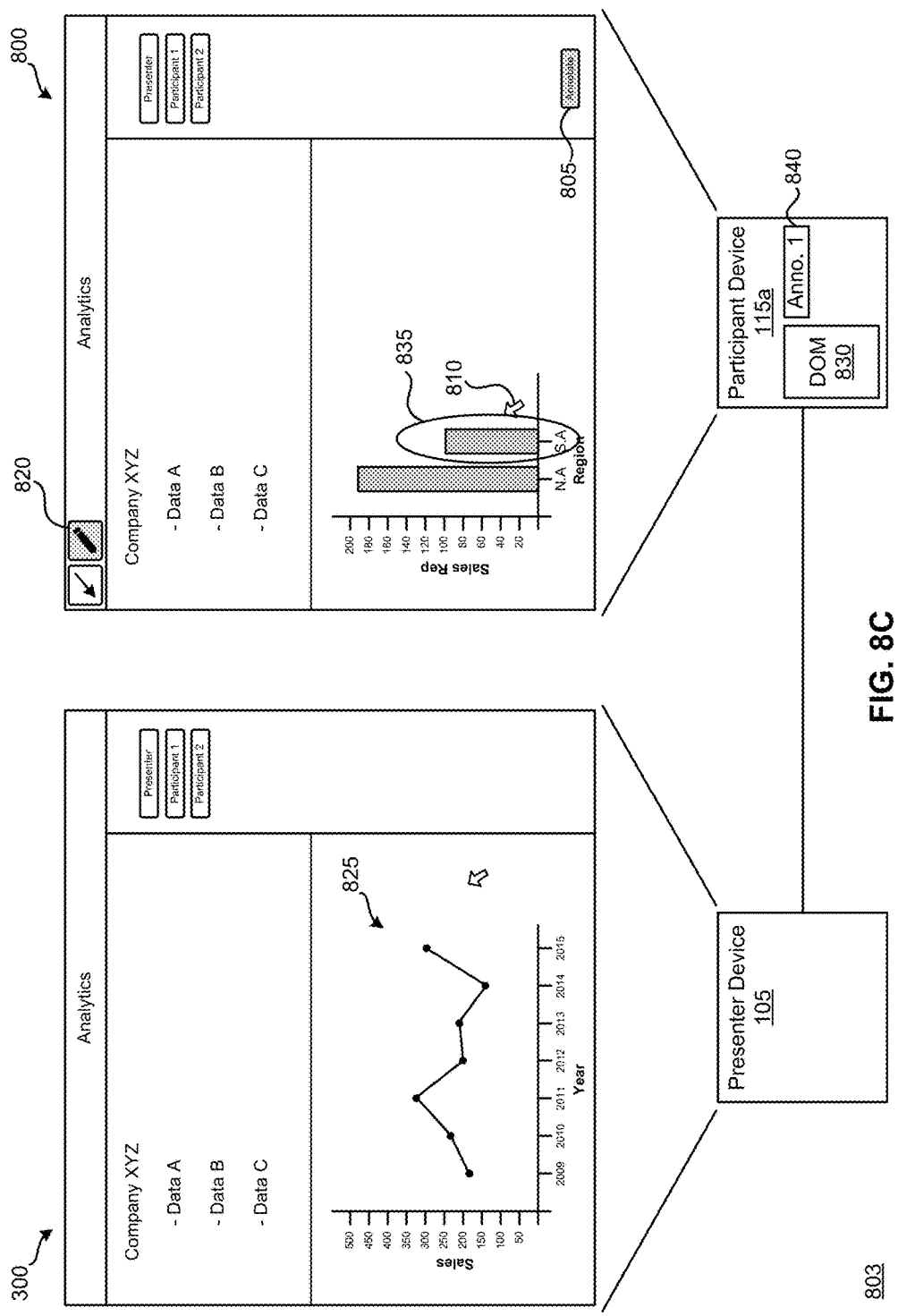

Referring to FIG. 8C, the third stage 803 illustrates presenter device 105 presenting the digital content page illustrated in FIG. 8A except that the digital content page illustrated in FIG. 8B includes a visualization 825 instead of visualization 330. Visualization 825 includes a line chart depicting the number of sales per year for years 2009 to 2015. The third stage 803 also illustrates GUI 800 after a user of participant device 115a selected UI item 820, as indicated by a gray highlighting of UI item 820, using cursor 810 to enable the drawing tool and used cursor 810 to draw annotation 835. In this example, participant device 115a stores annotation data 840 when annotation 835 is created. Annotation data 840 includes information about annotation 835 such as coordinates of annotation 835, dimensions of annotation 835, the shape of annotation 835, etc.

Figure 8D:
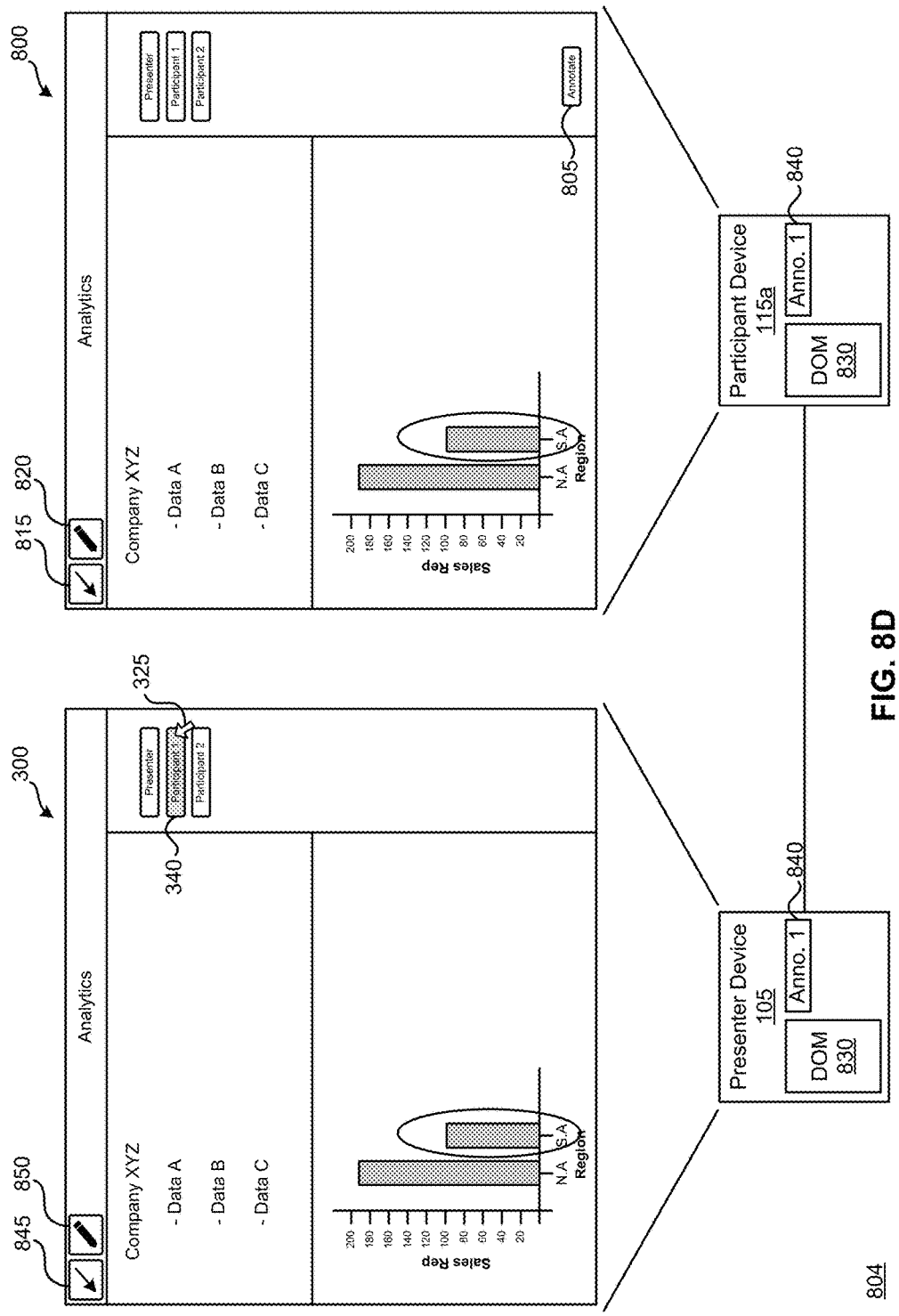

Referring to FIG. 8D, the fourth stage 804 shows GUI 300 after a user of presenter device 105 enables a feature for sharing the overlay created by a user of participant device 115a shown in FIG. 8C. For this example, the user of presenter device 105 enables such a feature by selecting UI item 340 using cursor 325. The selection of UI item 340 is indicated by a gray highlighting of UI item 340. Upon selection of UI item 340, participant device 115a sends DOM 830 and annotation data 840 to presenter device 105. In some embodiments, participant device 115a sends DOM 830 and annotation data 840 using a Javascript Object Notation (JSON) data format.

When presenter device 105 receives DOM 830 and annotation data 840, presenter device 105 disables the screen sharing feature and reproduces in GUI 300 the overlay (i.e., a snapshot of a digital content page) created by a user of participant device 115a based on DOM 830 and annotation data 840 in order to synchronize the shared overlay with participant device 115a. Presenter device 105 also provides UI items 845 and 850. UI items 845 and 850 are similar to UI items 815 and 820. That is, UI item 845 is configured to enable an arrow tool for add arrow annotations to the snapshot of the digital content page. UI item 850 is configured to enable a drawing tool for drawing annotations to the snapshot of the digital content page.

Figure 8E:
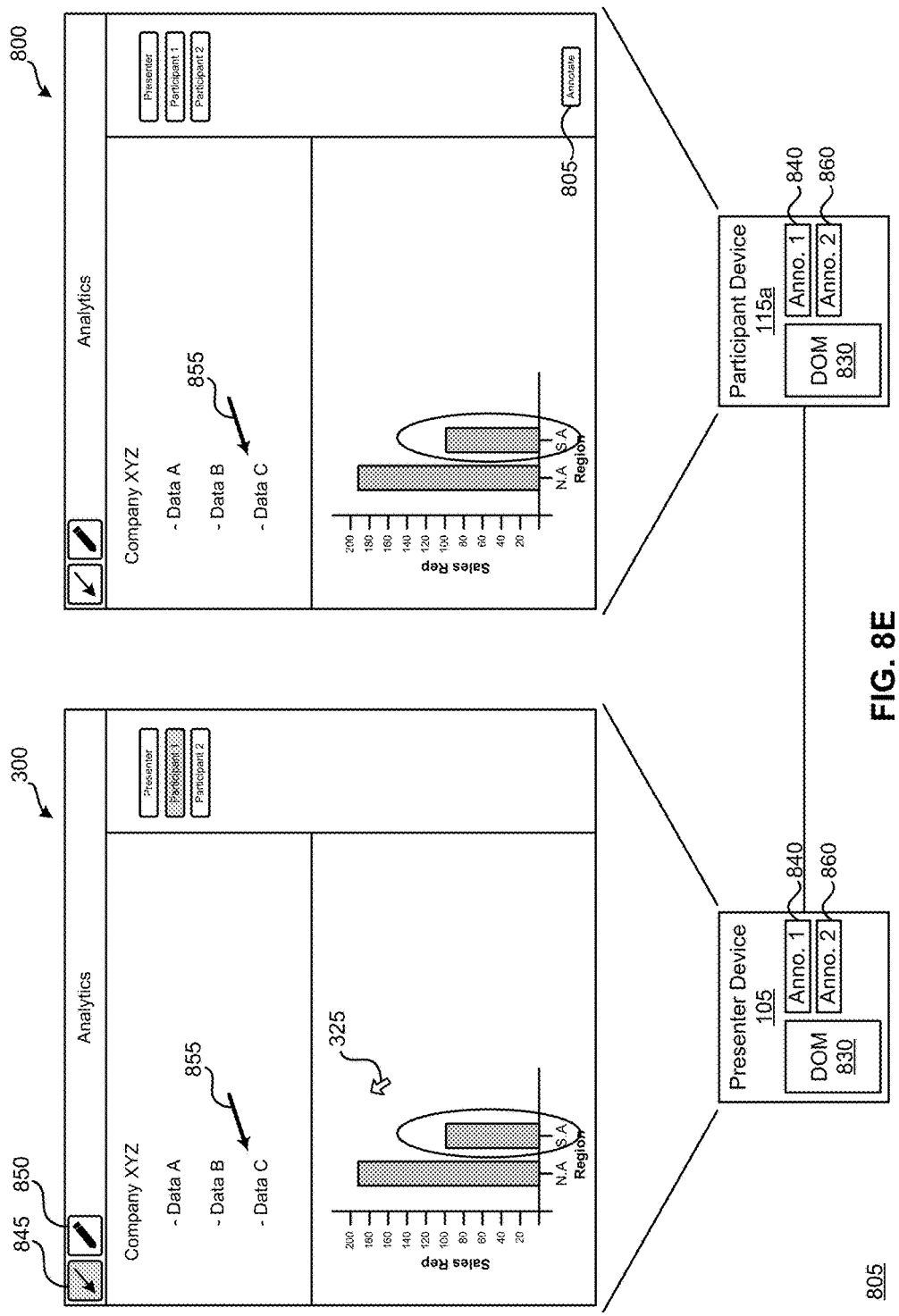

Referring to FIG. 8E, the fifth stage 805 illustrates presenter device 105 after a user of presenter device 105 has added annotation 855 to the shared overlay shown in FIG. 8D. In this example, a user of presenter device 105 added annotation 855 by selecting UI item 845, as indicated by a gray highlighting of UI item 845, using cursor 325 to enable the arrow tool and used cursor 325 to add annotation 835, an arrow. In this example, when annotation 855 is created, presenter device 105 stores annotation data 860 as well as sends annotation data 860 to participant device 115a. In some embodiments, presenter device 105 sends DOM annotation data 860 using a JSON data format. Annotation data 860 includes information about annotation 855 such as coordinates of annotation 855, dimensions of annotation 855, the shape of annotation 855, etc. When participant device 115a receives annotation data 860, participant device 115a updates GUI 800 with annotation 855 based on annotation data 860 in order to synchronize the shared overlay with presenter device 105.

In some embodiments, the collaboration application operating on a participant device may include a shared overlay feature that allows a user of the participant device to take a snapshot of the content page being presented by a presenter device, share the snapshot with another participant device, and make annotations to the shared snapshot during a collaboration session. The snapshot may be shared and annotations may be made to the shared snapshot while the presenter device in the collaboration session is continuing to present the same or different digital content.

FIG. 9 illustrates a shared overlay feature according to some embodiments. In particular, FIG. 9 illustrates presenter device 105, participant device 115a, and participant device 115b after presenter device 105, participant device 115a, and participant device 115b have established a collaboration session (e.g., according data flow 200). Presenter device 105 is displaying and sharing the same digital content page as that shown in GUI 300 of FIG. 8C. FIG. 9 also illustrates participant devices 115a and 115b after participant devices 115a and 115b have established a shared overlay session. In some embodiments, participant devices 115a and 115b establish the shared overlay session when one of the participant devices 115a and 115b selects UI item 905 configured to send a request to the other participant devices 115a or 115b to enable the shared overlay feature. When the other participant device 115a or 115b accepts the request (e.g., by selecting UI item configured to accept the shared overlay request), the shared overlay feature is enabled on both the participant devices 115a and 115b.

In response to enabling the shared overlay feature, the requesting participant device 115a or 115b generates DOM 910, which represents the digital content page being reproduced in GUI 800 at the instance the request is accepted (for this example the digital content page being reproduced in GUI 800 is the same as that shown in FIG. 8B), and sends DOM 910 to the other participant device 115a or 115b in order to synchronize the shared overlay with each other. Also in response to enabling of the shared overlay feature, the requesting participant device 115a or 115b stops displaying the digital content page that presenter device 105 is sharing, displays the snapshot of the digital content page that was taken when the shared overlay feature was enabled, and provides UI items 815 and 820.

When the other participant device 115a or 115b receives DOM 910, the other participant device 115a or 115b disables the screen sharing feature and reproduces in GUI 900 the overlay (i.e., a snapshot of a digital content page) created by a user of the requesting participant device 115a or 115b based on DOM 910 in order to synchronize the shared overlay with the requesting participant device 115a or 115b. The other participant device 115a or 115b also provides UI items 915 and 920. UI items 915 and 920 are similar to UI items 815 and 820. That is, UI item 915 is configured to enable an arrow tool for add arrow annotations to the snapshot of the digital content page. UI item 920 is configured to enable a drawing tool for drawing annotations to the snapshot of the digital content page.

In addition, FIG. 9 illustrates GUI 800 and GUI 900 after annotations 925 and 930 have been added (e.g., by a user of one of participant devices 115a and 115b) to the shared overlay using the arrow tool and the drawing tool provided by UI items 815/915 and 820/920, respectively. In this example, when annotation 925/930 is created, the participant device 115a or 115b on which they it was created stores annotation data 935/940 as well as sends (e.g., using a JSON data format) annotation data 935/940 to the other participant device 115a or 115b. Annotation data 935/940 includes information about annotation 935/940 such as coordinates of annotation 935/940, dimensions of annotation 935/940, the shape of annotation 935/940, etc. When the other participant device 115a or 115b receives annotation data 935/940, the other participant device 115a or 115b updates its GUI with annotation 925/930 based on annotation data 935/940 in order to synchronize the shared overlay between the participant devices 115a and 115b.

In some embodiments, the collaboration applications of a presenter device and participant devices in a collaboration session include an automated recording and playback feature (also referred to as a time travel feature) that records activity (e.g., digital content shared by the presenter device, cursor locations and movements displayed on the presenter device, annotations and/or notes added to overlays, audio exchange in an audio conference, video exchanged in a video conference, etc.) that occurs during the collaboration session. The time travel feature allows a user to playback (e.g., via a slider control) the collaboration session in a non-linear fashion so that the user may access any instance in time of the collaboration session without having to playback the entire collaboration session. In addition, the time travel feature indexes the comments, notes, and/or annotations by time and user. This way, a user may search and/or filter the comments, notes, and/or annotations added to the collaboration session by time and/or user in order to quickly and easily find portions of the collaboration session that is of interest to the user.

Figure 10:
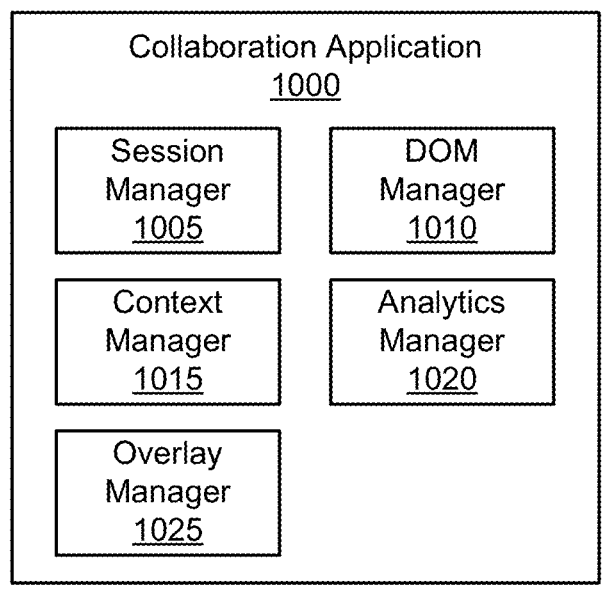
FIG. 10 illustrates a collaboration application according to some embodiments.

FIG. 10 illustrates a collaboration application 1000 according to some embodiments. In some embodiments, collaboration application 1000 operates on presenter device 105 and participant devices 115a-n and implements the operations described above by reference to FIGS. 1-9. As shown, collaboration application 1000 includes session manager 1005, DOM manager 1010, context manager 1015, analytics manager 1020, and overlay manager 1025.

Session manager 1005 is responsible for establishing and managing collaboration sessions (e.g., collaboration session 110). In some embodiments, session manager 1005 is configured to perform the operations illustrated in data flow 200. Session manager 1005 may handle the screen sharing feature as described above.

DOM manager 1010 manages DOMs during collaboration sessions. For example, when presenter device 105 shares a digital content page, DOM manager 1010 generates a copy of the DOM of the digital content page. DOM manager 1010 also reproduces digital content pages based on DOMs. For instance, when a particular participant device 115 receives a DOM from presenter device 105, the particular participant device 115 reproduces a digital content page based on the received DOM.

Context manager 1015 handles contextual data associated with DOMs. For instance, when presenter device 105 generates a copy of a DOM of a digital content page being shared, context manager 1015 generates contextual data associated with the DOM so that participant devices 115 may provide additional analytics data.

Analytics manager 1020 provides additional analytics data. For example, a particular participant device 115 may access additional analytics data based on contextual data associated with a DOM of a digital content page being presented by presenter device 105 and preference data stored on the particular participant device 115.

Overlay manager 1025 is configured to handle the private and shared overlay features described above. For instance, overlay manager 1025 may provide UI items (e.g., UI items 805 and 905) for enabling such features. Overlay manager 1025 may also provide UI items (e.g., UI items 815, 820, 845, 850, 915, and 920) for enabling annotation tools. Also, overlay manager 1025 may be responsible for synchronizing DOMs and annotation data between devices when sharing an overlay between devices.

Figure 11:
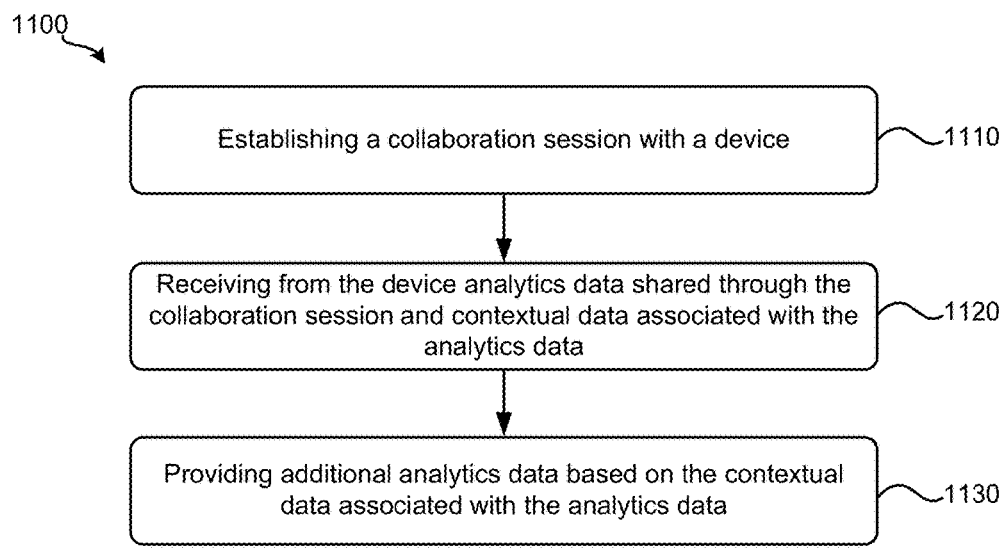
FIG. 11 illustrates a process for providing analytics data according to some embodiments.

FIG. 11 illustrates a process 1100 for providing analytics data according to some embodiments. In some embodiments, process 1100 is performed by a participant device 115. Process 1100 starts by establishing, at 1110, a collaboration session with a device (e.g., presenter device 105). In some embodiments, process 1100 performs operation 1110 according to data flow 200.

Next, process 1100 receives, at 1120, from the device analytics data shared through the collaboration session and contextual data associated with the analytics data. In some embodiments, the analytics data is in the form of a DOM that represents a digital content page being shared by the device when the device has enabled a screen sharing feature. In some such embodiments, when process 1100 receives the DOM, process 1100 reproduces the digital content page based on the DOM.

Finally, process 1100 provides, at 1130, additional analytics data based on the contextual data associated with the analytics data. In some embodiments, process 1100 provides additional analytics data further based on preference data. Referring to FIG. 4 as an example, participant device 115a provides additional analytics data (visualization 415 in this example) based on contextual data indicating that visualization 330 in GUI 300 is a visualization based on data related to sales representatives and region and preference data indicating that a user of participant device 115a is located in Asia. Referring to FIG. 5 as another example, participant device 115b provides additional analytics data (visualization 515 in this example) based on contextual data indicating that visualization 330 in GUI 300 is a visualization based on data related to sales representatives and region and preference data indicating that a user of participant device 115a is located in Europe.

Figure 12:
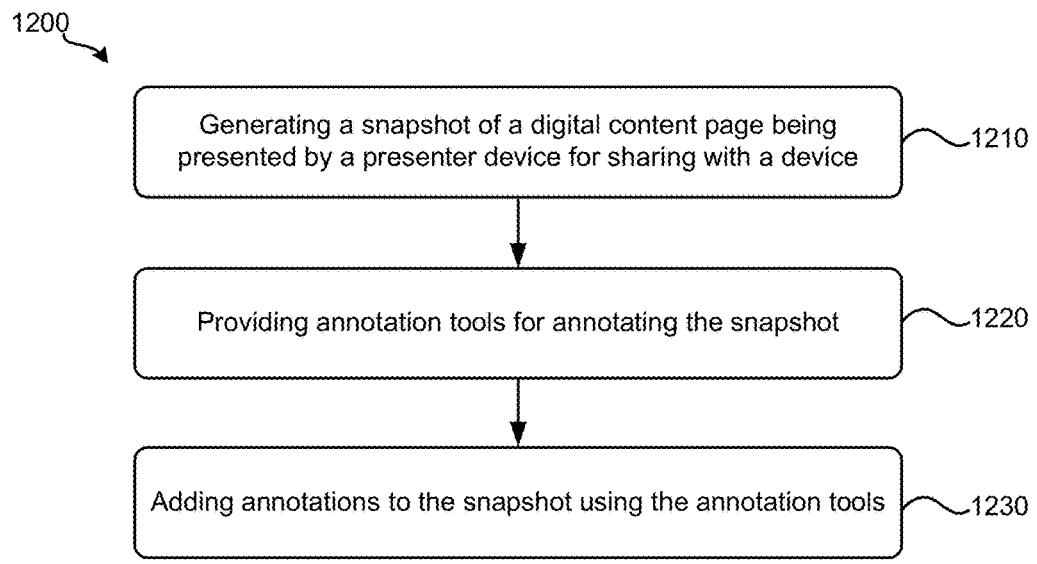
FIG. 12 illustrates a process for providing a shared overlay according to some embodiments.

FIG. 12 illustrates a process 1200 for providing a shared overlay according to some embodiments. In some embodiments, process 1200 is performed by a device (e.g., a participant device 115) that is in a collaboration session (e.g., collaboration session 110) with another device (e.g., presenter device 105 or a participant device 115). Process 1200 begins by generating, at 1210, a snapshot of a digital content page being presented by a presenter device (e.g., presenter device 105) for sharing with a device (e.g., presenter device 105 or a participant device 115). In some embodiments, the digital content page being presented by the presenter device is reproduced by the device perform process 1200 based on a DOM of the digital content page received from the presenter device. In some such embodiments, the snapshot of the digital content page is a copy of the DOM of the digital content page. Process 1200 may send the generated DOM to the device with which the snapshot is being shared in order to synchronize with the device.

Next, process 1200 provides, at 1220, annotation tools for annotation the snapshot. For instance, process 1200 may provide an arrow tool and a drawing tool such as the ones illustrated in FIGS. 8B-8E and 9. One of ordinary skill in the art will realize that process 1200 may provide any number of additional and/or different tools for annotating the snapshot in different embodiments.

Finally, process 1200 adds, at 1230, annotations to the snapshot using the annotation tools. Referring to FIG. 8C as an example, process 1200 may add annotation 835 using a drawing tool enabled via UI item 820. In some embodiments, when an annotation is added to the snapshot, process 1200 generates annotation data (e.g., annotation data 840) that includes information about the added annotation such as coordinates of the added annotation, dimensions of the added annotation, the shape of the added annotation, etc. Process 1200 may send the annotation data to the device with which the snapshot is being shared in order to synchronize with the device.

Figure 13:
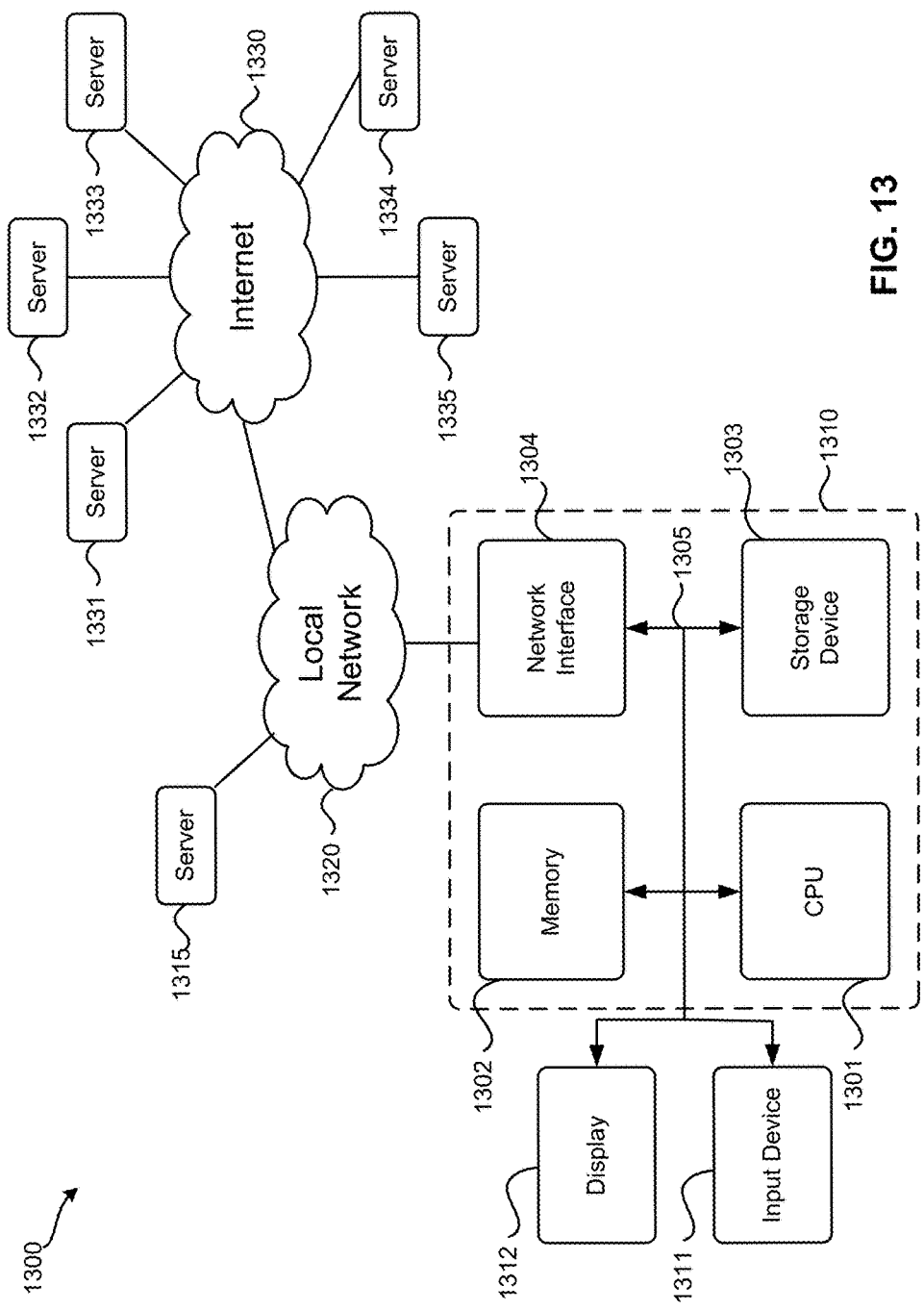
FIG. 13 illustrates an exemplary computer system according to some embodiments.

An exemplary computer system 1300 is illustrated in FIG. 13. Computer system 1310 includes a bus 1305 or other communication mechanism for communicating information, and a processor 1301 coupled with bus 1305 for processing information. Computer system 1310 also includes memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a first device, the program comprising sets of instructions for:

receiving from a computing device a message that includes a reference to a collaboration session between the first device and a second device, the collaboration session created by the computing device in response to the computing device receiving from the second device a request to create the collaboration session;

accessing, by the first device, the reference to the collaboration session in order to join the collaboration session with the second device;

providing, by the first device, a first user interface (UI) item configured to enable a private overlay feature and a second UI item configured to enable a shared overlay feature;

in response to receiving a selection of the first UI item, generating, at the first device, a first snapshot of a digital content page being presented by the second device and providing the first device a set of annotation tools for annotating the first snapshot of the digital content page;

in response to receiving a selection of the second UI item, establishing a shared overlay session with a third device, generating a second snapshot of the digital content page being presented by the second device; sending the second snapshot to the third device in order for the third device to reproduce the second snapshot of the digital content page for display on the third device; and providing the first device the set of annotation tools for annotating the second snapshot of the digital content page; and in response to receiving a first set of annotations through the set of annotation tools after receiving the selection of the first UI item, adding the first set of annotations to the first snapshot of the digital content page and presenting the first snapshot and the first set of annotations on a display of the first device; and in response to receiving a second set of annotations through the set of annotation tools after receiving the selection of the second UI item, adding the second set of annotations to the second snapshot of the digital content page and presenting the second snapshot and the second set of annotations on the display of the first device.

2. The non-transitory machine-readable medium of claim 1, wherein the set of instructions for generating the first snapshot of the digital content page comprises a set of instructions for generating a first document object model (DOM) of the digital content page, wherein the set of instructions for generating the second snapshot of the digital content page comprises a set of instructions for generating a second DOM of the digital content page, wherein the program further comprises a set of instructions for sending the third device the second DOM of the digital content page for the third device to reproduce the second snapshot of the digital content page for display on the third device.

3. The non-transitory machine-readable medium of claim 1, wherein the program further comprises a set of instructions for sending a set of annotation data to the third device for the third device to update the reproduced digital content page with the second set of annotations based on the set of annotation data.

4. The non-transitory machine-readable medium of claim 1, wherein the set of annotation tools comprises a first tool for adding arrow annotations to the first or second snapshot of the digital content page and a second tool for drawing annotations on the first or second snapshot of the digital content page.

5. The non-transitory machine-readable medium of claim 1, wherein the program further comprises a set of instructions for, in further response to receiving the selection of the first UI item, stopping the presentation of the digital content page being presented by the second device and presenting the first snapshot of the digital content page.

6. The non-transitory machine-readable medium of claim 1, wherein the program further comprises sets of instructions for:
receiving a request from the second device to share the first snapshot and the first set of annotations;
sending the second device a document object model (DOM) of the digital content page for the second device to reproduce the first snapshot of the digital content page for display on the second device; and
sending the second device a set of annotation data that represents the first set of annotations for the second device to reproduce the first set of annotations on the first snapshot of the digital content page for display on the second device.

7. The non-transitory machine-readable medium of claim 6, wherein the set of annotation data is a first set of annotation data, wherein the program further comprises sets of instructions for:
receiving a second set of annotation data from the second device that represents a third set of annotations added to the first snapshot of the digital content page by the second device; and
updating the first snapshot of the digital content page and the first set of annotations presented on the display of the first device with the second set of annotations based on the second set of annotation data.

8. A method, executable by a first device, comprising:
receiving from a computing device a message that includes a reference to a collaboration session between a first device and a second device, the collaboration session created by the computing device in response to the computing device receiving from the second device a request to create the collaboration session;
accessing, by the first device, the reference to the collaboration session in order to join the collaboration session with the second device;
providing, by the first device, a first user interface (UI) item configured to enable a private overlay feature and a second UI item configured to enable a shared overlay feature;
in response to receiving a selection of the first UI item, generating, at the first device, a first snapshot of a digital content page being presented by the second device and providing the first device a set of annotation tools for annotating the first snapshot of the digital content page;
in response to receiving a selection of the second UI item, establishing a shared overlay session with a third device, generating a second snapshot of the digital content page being presented by the second device; sending the second snapshot to the third device in order for the third device to reproduce the second snapshot of the digital content page for display on the third device; and providing the first device the set of annotation tools for annotating the second snapshot of the digital content page; and
in response to receiving a first set of annotations through the set of annotation tools after receiving the selection of the first UI item, adding the first set of annotations to the first snapshot of the digital content page and presenting the first snapshot and the first set of annotations on a display of the first device; and
in response to receiving a second set of annotations through the set of annotation tools after receiving the selection of the second UI item, adding the second set of annotations to the second snapshot of the digital content page and presenting the second snapshot and the second set of annotations on the display of the first device.

9. The method of claim 8, wherein generating the first snapshot of the digital content page comprises generating a first document object model (DOM) of the digital content page, wherein generating the second snapshot of the digital content page comprises generating a second DOM of the digital content page, wherein the method further comprises sending the third device the second DOM of the digital content page for the third device to reproduce the second snapshot of the digital content page for display on the third device.

10. The method of claim 8 further comprising sending a set of annotation data to the third device for the third device to update the reproduced digital content page with the second set of annotations based on the set of annotation data.

11. The method of claim 8, wherein the set of annotation tools comprises a first tool for adding arrow annotations to the first or second snapshot of the digital content page and a second tool for drawing annotations on the first or second snapshot of the digital content page.

12. The method of claim 8 further comprising, in further response to receiving the selection of the first UI item, stopping the presentation of the digital content page being presented by the second device and presenting the first snapshot of the digital content page.

13. The method of claim 8 further comprising:
receiving a request from the second device to share the first snapshot and the first set of annotations;
sending the second device a document object model (DOM) of the digital content page for the second device to reproduce the first snapshot of the digital content page for display on the second device; and
sending the second device a set of annotation data that represents the first set of annotations for the second device to reproduce the first set of annotations on the first snapshot of the digital content page for display on the second device.

14. The method of claim 13, wherein the set of annotation data is a first set of annotation data, wherein the method further comprises:
receiving a second set of annotation data from the second device that represents a third set of annotations added to the first snapshot of the digital content page by the second device; and
updating the first snapshot of the digital content page and the first set of annotations presented on the display of the first device with the second set of annotations based on the second set of annotation data.

15. A system comprising:
a set of processing units;
a memory; and
a machine-readable medium storing a program, which when executed by executable at least one processing unit in the set of processing units, causes the at least one processing unit to:
receive from a computing device a message that includes a reference to a collaboration session between the system and a first device, the collaboration session created by the computing device in response to the computing device receiving from the first device a request to create the collaboration session;
access, by the system, the reference to the collaboration session in order to join the collaboration session with the first device;
providing, by the system, a first user interface (UI) item configured to enable a private overlay feature and a second UI item configured to enable a shared overlay feature;
in response to receiving a selection of the first UI item, generate, at the system, a first snapshot of a digital content page being presented by the first device and provide the system a set of annotation tools for annotating the first snapshot of the digital content page;
in response to receiving a selection of the second UI item, establishing a shared overlay session with a second device, generate a second snapshot of the digital content page being presented by the first device; send the second snapshot to the second device in order for the second device to reproduce the second snapshot of the digital content page for display on the second device; and provide the system the set of annotation tools for annotating the second snapshot of the digital content page; and
in response to receiving a first set of annotations through the set of annotation tools after receiving the selection of the first UI item, add the first set of annotations to the first snapshot of the digital content page and present the first snapshot and the first set of annotations on a display of the system; and
in response to receiving a second set of annotations through the set of annotation tools after receiving the selection of the second UI item, add the second set of annotations to the second snapshot of the digital content page and present the second snapshot and the second set of annotations on the display of the system.

16. The system of claim 15, wherein generating the first snapshot of the digital content page comprises generating a first document object model (DOM) of the digital content page, wherein generating the second snapshot of the digital content page comprises generating a second DOM of the digital content page, wherein the program further causes the at least one processing unit to send the second device the second DOM of the digital content page for the second device to reproduce the second snapshot of the digital content page for display on the second device.

17. The system of claim 15, wherein the program further causes the at least one processing unit to send a set of annotation data to the second device for the second device to update the reproduced digital content page with the set of annotations based on the set of annotation data.

18. The system of claim 15, wherein the program further causes the at least one processing unit to, in further response to receiving the selection of the first UI item, stop the presentation of the digital content page being presented by the first device and presenting the first snapshot of the digital content page.

19. The system of claim 15, wherein the program further causes the at least one processing unit to:
receive a request from the first device to share the first snapshot and the first set of annotations;
send the first device a document object model (DOM) of the digital content page for the first device to reproduce the first snapshot of the digital content page for display on the first device; and
send the first device a set of annotation data that represents the first set of annotations for the first device to reproduce the first set of annotations on the first snapshot of the digital content page for display on the first device.

20. The system of claim 19, wherein the set of annotation data is a first set of annotation data, wherein the program further causes the at least processing unit to:
receive a second set of annotation data from the first device that represents a third set of annotations added to the first snapshot of the digital content page by the first device; and
update the first snapshot of the digital content page and the first set of annotations presented on the display of the system with the second set of annotations based on the second set of annotation data.

* * * * *